Aug. 1, 1961 G. J. BAIR 2,994,161
METHOD OF AND APPARATUS FOR CASTING GLASS
Filed Feb. 3, 1954

INVENTOR.
GEORGE J. BAIR
BY Clarence R. Patty, Jr.
ATTORNEY.

United States Patent Office 2,994,161
Patented Aug. 1, 1961

2,994,161
METHOD OF AND APPARATUS FOR CASTING GLASS
George J. Bair, Corning, N.Y., assignor to Corning Glass Works, Corning, N.Y., a corporation of New York
Filed Feb. 3, 1954, Ser. No. 407,882
7 Claims. (Cl. 49—5)

This invention relates to the art of casting molten glass and is particularly concerned with an improved arrangement especially adapted for the casting of relatively large diameter and relatively thick glass lens blanks of optical quality.

In the production of glass lens blanks and other glass articles requiring a similar degree of optical quality, it is of paramount importance first that the molten glass be brought to a state of substantially complete homogeneity, and secondly that care be taken during subsequent handling and shaping operations to avoid introducing imperfections such as striae, folds, or laps in the ultimate solid, shaped, glass body. These problems of manufacture of well homogenized glass and the casting thereof into cane of relatively small cross-sectional dimension, two to four inches for example, have been successfully surmounted by feeding suitably fined molten glass through glass stirring apparatus, such for example as shown in Patent No. 2,569,459 into a suitable mold in the fashion taught in Patent No. 2,534,415.

The present invention is concerned however with the production of so called "massive" optical lens blanks which cover a diameter range of from 4″ to 18″ or over and a thickness of from 2½″ to 14″. Blanks of a diameter of 14″ and of approximately the same thickness having been made are typical of those required. These lens blanks must not only be free of striae, folds, or laps, but must also have an overall refractive index variation of less than $\pm 5 \times 10^{-5}$. Facilities for providing glass meeting this need are fully disclosed in the copending applications of Charles F. DeVoe and Robert C. Cleveland SN344,133, now Patent No. 2,762,167 and 343,833, now Patent No. 2,716,023 filed March 23, 1953.

Two problems remain to the successful manufacture of "massive" optical lens blanks, the one, that of freeing them from the molds after completion of casting and subsequent annealing; and the other, that of maintaining the surface glass of a blank, being cast in the fashion taught by Patent No. 2,534,415, suitably fluid at least until it has distributed itself to the lateral confines of a mold whose diameter is usually several times the cross-sectional dimension of cane such as cast by the system of such patent number.

When glass articles are conventionally formed by pressing or blowing, sticking of the glass to the mold is customarily prevented by maintenance of the mold at a temperature just below that at which the glass adheres thereto. The long period of time it requires to properly charge a "massive" optical mold and the necessity for maintenance of glass therein at substantially the temperature of its introduction into the mold until the mold is filled, however, precludes the possibility of removal of the cast article from the mold before it attains a temperature at which the glass will adhere thereto. Because of the relatively small mean cross-section of cane cast by the system of Patent No. 2,534,415 the heat loss from surface glass is small and presents no problem. Also the freeing of glass from the mold in the manufacture of relatively small cross-sectional cane, as in the above Patent No. 2,534,415 presents only a minor problem solved by use of a mold composed of a non-wetting alloy or by use of one made carbon. These materials are only practicable and/or satisfactory however when used in a system wherein the cross-section of the article cast is relatively small, and wherein there is continuous movement of the formed cane through the die or mold, as in the system of Patent No. 2,534,415.

I have now found that the problem of freeing the glass from a mold in which a "massive" article is cast can be solved by lining the mold with a parting material comprising a layer of thin metal foil, which, while adhering to the cast glass, is freely detachable or separable from the mold surface. The foil employed must however be sufficiently thin to be flexible or yieldable with the glass in order to avoid any cracking of the glass due to differential thermal expansion of the glass and foil as the glass cools. Also the foil desirably has a melting temperature safely above that at which the glass is cast to assure that the foil will remain intact throughout the casting cycle. If the glass casting temperature is critically near the melting point of the foil, more than one layer of foil may be employed to more positively assure maintenance of at least one layer of foil between the glass and the mold throughout the casting operation.

In order to avoid surface chilling and consequent skin formation on the cast glass and to thus aid its flow to the lateral limits of the mold heat is directed into the top surface of the accumulated glass throughout the casting process. I have found that heat provided by electric heaters arranged over the mold aided by heat reflected back into the glass by exposed foil above the glass level in the mold satisfactorily perform this function. If the glass being cast has a melting point below that of aluminum, aluminum foil is quite satisfactory as the parting material. In the casting of glass having a higher melting temperature stainless steel foil may be used. As will be understood satisfactory casting operations always require the use of suitably preheated molds.

For a better understanding of the present invention reference is made to the acompanying drawing in which.

Figure 1:
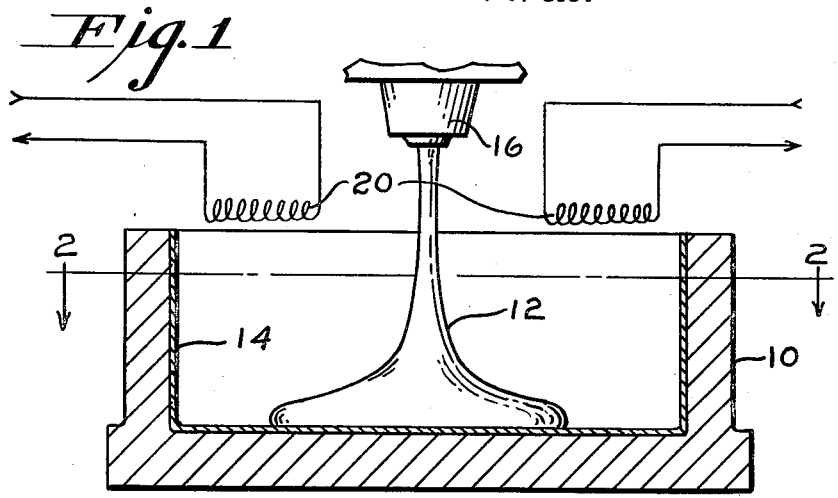
FIG. 1 shows in vertical section and in part diagrammatically an apparatus for casting glass in accordance with the invention.
Figure 2:
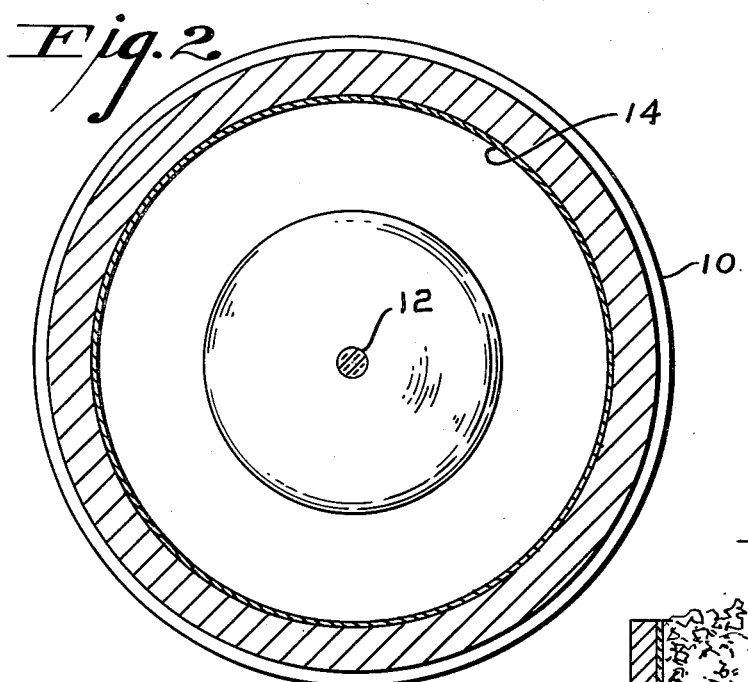
FIG. 2 is a sectional view of FIG. 1 taken along lines 2—2.

In the drawing a circular mold 10 is shown receiving a continuous stream of glass 12. Mold 10 may be constructed of any suitable ceramic refractory or metal in any conventional manner and may be supported on a table or carriage (not shown) for subsequent removal to an annealing furnace.

In accordance with the invention the entire cavity wall surface of mold 10 is lined with parting material comprising a thin, flexible and readily yieldable metal foil 14 which is shaped in accordance with the contour of the mold surface, but is completely separable therefrom for subsequent removal. The parting material may be preformed or may be shaped into the mold contour by a roller or other suitable tool. Moreover because of the characteristics of the parting material it readily yields to the exact mold contour as the mold is being filled.

The mold 10 can be readily filled in the manner taught by Patent No. 2,534,415 with glass from a glass stream 12 permitted to flow continuously from an orifice 16 of a suitable supply source, such for example as those disclosed in the referred to copending DeVoe and Cleveland patent applications. After the mold has been filled the stream may be readily diverted from the mold until it is replaced with another. An array of electrical heating coils 20 positioned above mold 10 may be arranged as the spokes of a wheel or in a spiral about stream 12 and conventional means (not shown) employed to control the heating current as required to maintain the surface of the cast glass at the best temperature for carrying out the process.

When mold 10 has been filled the body of glass or blank thus formed may be cooled in the mold, preferably by transfer of the filled mold to an annealing furnace immediately after casting the blank. The cooled blank and liner 14, which has been fusion-sealed to the blank, may then be removed from the mold after which the parting material may be removed from the blank by any suitable means such as by grinding or chemical treatment.

Figure 3:
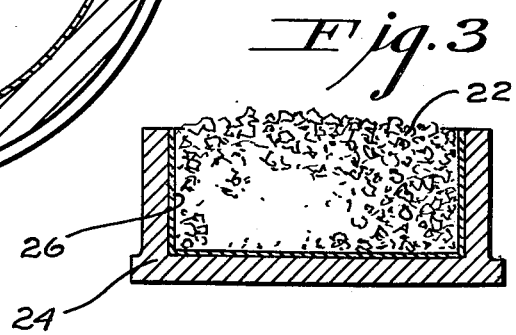
FIG. 3 is a sectional elevation of a mold showing its use in an alternative manner in accordance with the invention.

While a mold lined with foil is particularly adapted to receive a charge from a continuous stream of glass, as taught by Patent No. 2,534,415, such mold may also be used with equal facility in methods of remolding glass in accordance with a practice common to the optical glass blank industry in charging small lens blank molds in repressing operations prior to the method taught by the aforesaid patent. Thus as shown in FIG. 3 a mass of glass pieces 22, which may have been selected from a pot melt, may be placed in a mold 24 having a metal foil liner 26, heated above the softening point of the glass in a suitable oven until the pieces unify and conform the resulting mass to the shape of the mold, and then annealed before removal of the blank with its adhered layer of foil from the mold.

What is claimed is:

1. A method of forming a glass blank which includes lining a blank-forming mold cavity wall with a parting material which at the glass temperature at which the blank is formed adheres to the glass but not to the mold cavity wall, introducing glass into the lined mold cavity, directing sufficient heat directly onto the glass therein exposed to the mold cavity entrance to maintain such glass in a molten state as formation of a blank progresses, annealing the blank within the mold, and then removing the blank and the adhered parting material from the mold.

2. A method of forming a glass blank which includes lining a blank-forming mold cavity wall with a parting material which at the glass temperature at which the blank is formed adheres to the glass but not to the mold cavity wall, introducing a stream of glass into the lined mold cavity for the time period required to fill the same to a desired level and in the meantime directing heat into the mold cavity via its entrance to maintain the temperature of the exposed glass within the mold near its temperature of introduction thereinto, annealing the blank within the mold, and then removing the blank and the adhered parting material from the mold.

3. A method such as defined by claim 2 which includes the step of removing the parting material from the blank.

4. A method of forming a glass blank which includes lining a blank-forming mold cavity wall with a parting material which at the glass temperature at which the blank is formed adheres to the glass but not to the mold cavity wall, introducing an accumulation of pieces of glass into the lined mold cavity, directing sufficient heat into the glass within such cavity through its entrance to unify such pieces and conform the resulting mass to the mold cavity wall shape to complete formation of the blank, annealing the blank within the mold, and then removing the blank and the adhered parting material from the mold.

5. A method of casting a glass blank which comprises lining the glass-shaping surface of a blank-forming mold with at least one layer of a parting material comprising thin flexible and readily yieldable metal foil which remains intact at the temperature at which the blank is cast, conforming the lining to such glass shaping surface by flowing a stream of molten glass into the lined mold, and supplying sufficient heat directly to the surface of the molten glass therein during the entire time that glass is being flowed into the mold to assure distribution of the glass to the lateral confines of the mold cavity.

6. A glass-article casting system which includes a mold having a glass confining wall-surface lined with at least one layer of thin metal foil readily conformable to the exact mold wall contour solely by the pressure exereted thereon by molten glass introduced into the mold and readily yieldable with glass during its contraction within the mold; said foil having the characteristic of remaining intact while adhering to the glass only, at the temperature at which glass is cast in the mold, said mold having arranged thereover means for directing a freely falling stream of molten glass solely into the central area of the mold cavity, and facilitates surrounding such stream adapted to direct heat into the mold cavity entrance in sufficient quantity to maintain the surface layer of such glass at a flowable viscosity to the lateral confines of the mold cavity.

7. A method of casting a glass article which comprises lining the glass-shaping surface of an article-forming mold with at least one layer of a parting material comprising thin flexible and readily yieldable metal foil which remains intact at the temperature at which the article is cast, conforming the lining to such glass shaping surface by slowly filling the mold from a small freely falling stream of molten glass while directing sufficient heat down into the mold during the entire time that glass is being flowed thereinto to maintain its viscosity low enough to assure spreading of the accumulated glass to the lateral confines of the mold cavity, and thereafter removing the parting material encased article from the mold.

References Cited in the file of this patent

UNITED STATES PATENTS

| 250,933 | McLean | Dec. 13, 1881 |
|---|---|---|
| 1,965,242 | Kelly | July 3, 1934 |
| 2,048,319 | Benner et al. | July 21, 1936 |
| 2,215,214 | Galey | Sept. 17, 1940 |
| 2,451,086 | Hicks et al. | Oct. 12, 1948 |

FOREIGN PATENTS

| 133,147 | Australia | June 14, 1949 |
|---|---|---|
| 25,250 | Great Britain | 1903 |